US010659170B2

(12) United States Patent
Ariesen (10) Patent No.: US 10,659,170 B2
(45) Date of Patent: May 19, 2020

(54) ELECTRICAL TAP

(71) Applicant: TECHNETIX B.V., Veenendaal (NL)

(72) Inventor: Jan Ariesen, Veenendaal (NL)

(73) Assignee: Technetix B.V., Veenendaal (NL)

( * ) Notice: Subject to any disclaimer, the term of this patent is extended or adjusted under 35 U.S.C. 154(b) by 0 days.

(21) Appl. No.: 16/036,008

(22) Filed: Jul. 16, 2018

(65) Prior Publication Data
US 2019/0190620 A1 Jun. 20, 2019

(30) Foreign Application Priority Data
Dec. 14, 2017 (GB) .................................. 1720897.6

(51) Int. Cl.
*H04B 10/00* (2013.01)
*H04B 10/80* (2013.01)
*H04B 3/44* (2006.01)
*H04B 10/27* (2013.01)

(52) U.S. Cl.
CPC ............. *H04B 10/808* (2013.01); *H04B 3/44* (2013.01); *H04B 10/27* (2013.01)

(58) Field of Classification Search
CPC ........ H04B 10/808; H04B 3/44; H04B 10/27; H04B 10/25753; H04B 10/25754; H04B 10/25751; H04B 10/272; H04B 10/2503; H04B 10/1123; H04B 10/564; H04B 10/806; H04B 2203/5445; H04B 2203/547; H04B 2203/5483; H04B 2203/5491; H04Q 2011/0015; H04Q 11/0005
USPC ......... 398/115, 116, 66, 67, 70, 71, 72, 117, 398/171, 19
See application file for complete search history.

(56) References Cited

U.S. PATENT DOCUMENTS

| 4,367,557 A * | 1/1983 | Stern ........................ | H04K 3/41 725/149 |
| 5,664,002 A * | 9/1997 | Skinner, Sr. ......... | H04B 10/808 379/56.2 |
| 6,980,091 B2 * | 12/2005 | White, II ................. | H04B 3/56 333/24 R |
| 7,064,654 B2 * | 6/2006 | Berkman ................. | H04B 3/54 340/12.3 |
| 7,072,407 B2 * | 7/2006 | Schurig .................. | H04B 3/542 375/257 |

(Continued)

FOREIGN PATENT DOCUMENTS

GB 2423904 A * 9/2006 ............. H04H 20/78

OTHER PUBLICATIONS

Search Report issued in App. No. GB1720897.6 (dated Jun. 7, 2018).

*Primary Examiner* — Hibret A Woldekidan
(74) *Attorney, Agent, or Firm* — Barnes & Thornburg LLP (57) ABSTRACT

There is provided an outdoor tap comprising an input and an output connectable to a signal path carrying electrical power and an RF signal, and a plurality of output ports connectable to users of a broadband network, wherein a power return path is provided between each output port and the input, the power return path selectively actuable to transmit electrical power from a user to power elements disposed in the signal path. A switch is disposed in the power return path, the switch selectively operable to activate the power return path. The switch is responsive to AC power from a user when a main electrical grid supply is interrupted.

8 Claims, 6 Drawing Sheets

(56) References Cited

U.S. PATENT DOCUMENTS

| | | | | |
|---|---|---|---|---|
| 7,221,906 B2* | 5/2007 | Lim | ................ | H04B 10/25755 |
| | | | | 398/116 |
| 7,450,000 B2* | 11/2008 | Gidge | ................ | H04B 3/58 |
| | | | | 340/3.1 |
| 7,466,225 B2* | 12/2008 | White, II | ................ | H04B 3/56 |
| | | | | 340/12.32 |
| 8,198,999 B2* | 6/2012 | White, II | ................ | H04B 3/56 |
| | | | | 340/12.32 |
| 8,818,192 B1 | 8/2014 | Smith et al. | | |
| 2002/0037054 A1* | 3/2002 | Schurig | ................ | H04B 3/542 |
| | | | | 375/257 |
| 2008/0159744 A1 | 7/2008 | Soto et al. | | |
| 2011/0260538 A1* | 10/2011 | Huang | ................ | H02J 9/062 |
| | | | | 307/64 |
| 2013/0148972 A1* | 6/2013 | Kazawa | ................ | H04B 10/27 |
| | | | | 398/100 |
| 2013/0169042 A1 | 7/2013 | Melamed | | |
| 2013/0342272 A1* | 12/2013 | Riggsby | ................ | H03F 3/195 |
| | | | | 330/185 |
| 2014/0369687 A1 | 12/2014 | Jain | | |
| 2015/0007246 A1* | 1/2015 | Ariesen | ................ | H04N 7/102 |
| | | | | 725/127 |
| 2015/0288391 A1* | 10/2015 | Li | ................ | H04B 1/44 |
| | | | | 370/297 |
| 2015/0333567 A1* | 11/2015 | Bronkhorst | ................ | H04N 7/102 |
| | | | | 330/127 |
| 2016/0323949 A1* | 11/2016 | Lee | ................ | H05B 45/10 |
| 2017/0063086 A1 | 3/2017 | Monnerat et al. | | |
| 2017/0289826 A1* | 10/2017 | Riggsby | ................ | H03F 3/195 |
| 2018/0219410 A1* | 8/2018 | Harris | ................ | H02J 9/00 |

* cited by examiner

ELECTRICAL TAP

CROSS REFERENCE TO RELATED APPLICATIONS

This application claims priority to United Kingdom Patent Application No. 1720897.6, filed Dec. 14, 2017. The disclosure set forth in the referenced application is incorporated herein by reference in its entirety.

FIELD OF THE INVENTION

This invention relates to an electrical tap, and in particular an outdoor tap for use in a broadband network.

BACKGROUND TO THE INVENTION

Electrical taps are used in broadband networks to tap signal from the main signal supply path and supply a number of individual users or subscribers associated with the tap. A broadband network typically includes signals supplied along both fibre and coaxial cable and within the network are active components that require electrical power to operate and supply broadband signals to the users. In regions where the mains electricity supply is frequently interrupted, the network will cease to operate if the power ceases. Often homes in such areas have an electricity backup system but even if power is restored to the individual home, there is still no broadband signal due to the active components in the network lacking power until the mains supply is restored.

SUMMARY OF THE INVENTION

In accordance with one aspect of the present invention, there is provided an electrical tap unit, which may be an outdoor tap, comprising an input and an output connectable to a signal path carrying electrical power and an RF signal, typically in a broadband network such as a CATV network, and a plurality of output ports, such as output tap ports, connectable to users of a broadband network, wherein a power return path is provided between each output port and the input, the power return path selectively actuable to transmit electrical power from a user to power elements, such as an optical node, disposed in the signal path. In the event of a power cut, and where an individual user has their own backup power supply, the user's power supply can be used to power elements in the network, such as an upstream element and in particular a node. This allows the user to regain broadband network services even if the mains power supply is still interrupted.

A switch means, such as a switch, may be disposed in the power return path, the switch means selectively operable to activate the power return path. Thus when a power cut occurs, the switch means can operate in response to a backup power supply associated with a user.

The switch means is preferably operable between a first position in which the power return path is not active and there is a power connection between the output port and the input port, and a second position in which the power return path is active from the tap port to the input port. The power return path becomes active when an individual user home gains power due to an independent backup power supply. Thus the switch means may be responsive to power from a user.

Preferably the power return path comprises a first section connectable to the input and a second section to activate the switch means. The second section may comprise a rectifier, such as a diode, to convert AC power to DC power and switch operating means, such as one or more relays.

The power return path preferably conveys at least AC power so that AC power from a user is conveyable as AC power to an active component.

In accordance with another aspect of the invention, there is provided a method of reinstating power to electrically powered elements in a broadband network, comprising:
modifying an electrical tap comprising an input connected to a broadband network and output tap ports supplying users of the network so as to include a selectively actuable power return path between the output tap ports and the input;
during a power interruption, diverting power from a user connected to an output port and the user having an electrical supply so that the power travels along the power return path from the user, thereby to power upstream elements, such as a node.

During a power interruption, the powered upstream elements, such as a node, will lose power. To remain active, the upstream element will use reverse powering delivered by diverting power from a user having an electrical supply and connected to an output tap port so that the power travels along the power return path from the user.

The method may further comprise disposing a switch means in the power return path, the switch selectively operable to activate the power return path.

The invention will now be described, by way of example, with reference to the accompanying drawings in which.

DESCRIPTION

Figure 1:
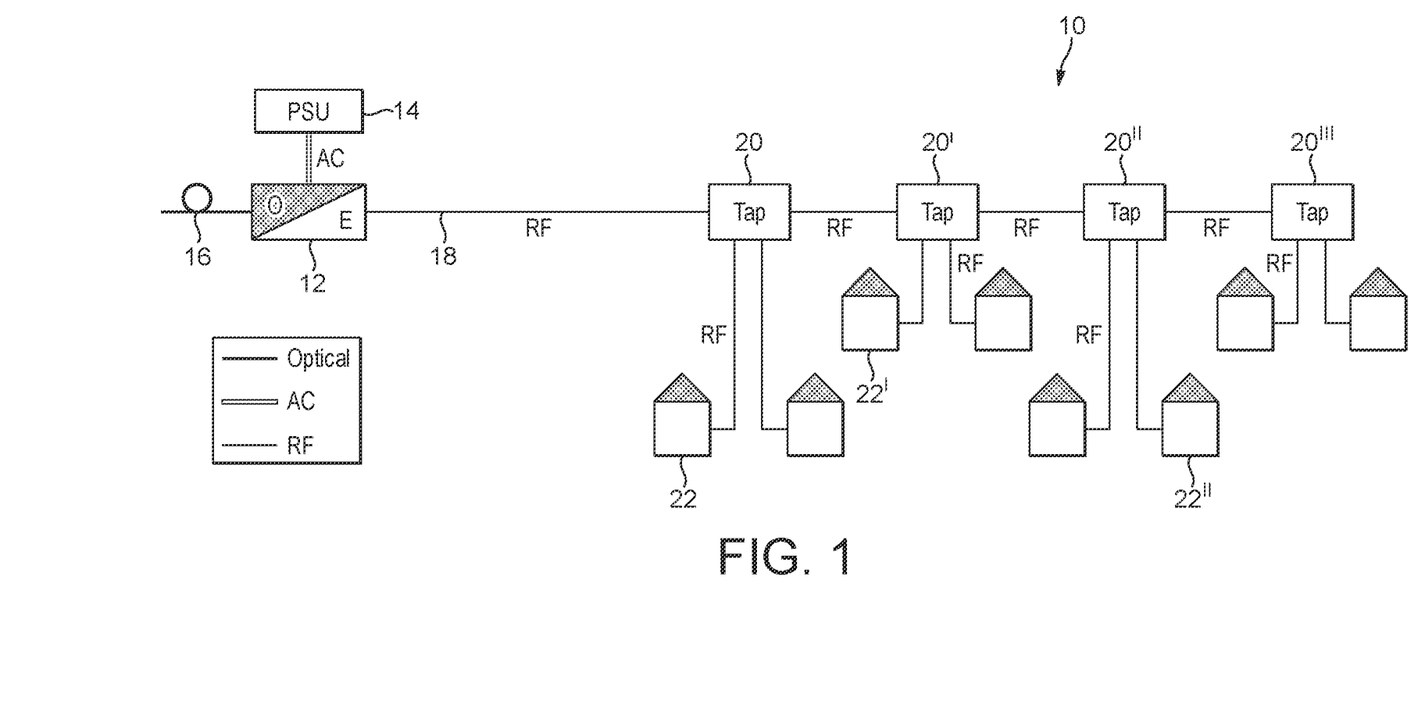
FIG. 1 is a schematic diagram of a broadband network.

FIG. 1 shows a schematic diagram of a broadband network 10 built where active components requiring electrical power to operate, such as an optical node 12, are powered by individual power supply units 14 connected to the main electricity grid. Optical signals travel via fibre cable 16 to optical node 12 where they are converted into RF signals which travel along coaxial cable to the homes of users along path 18. Within main signal path 18 of the network are disposed a plurality of outdoor taps 20, 20', 20", 20''' which tap signal from path 18 to supply signal to individual users in dwellings or homes 22, 22', 22". When power is available throughout the network, bi-directional RF signals travel between homes 22, 22', 22" and node 12. Signals are sent downstream from a headend to individual users and users can send RF signals upstream to a headend associated with a broadband and/or CATV supplier.

When the main power supply is interrupted, and power is lost, the network ceases to operate as power supply unit 14 is no longer supplying AC power to optical node 12. In regions with intermittent power supply, often many homes will have an electricity backup system but even if the TV and data network come to life, there will be no RF signal to the user as power supply unit 14 will lack power until the main electricity supply grid is restored and so optical node 12 cannot operate.

Figure 2:
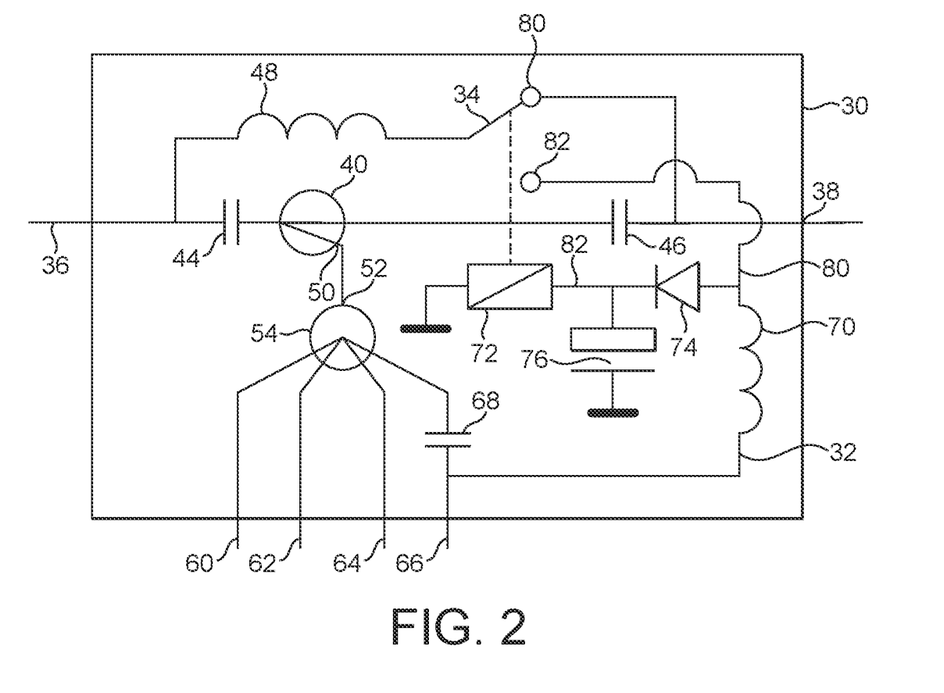
FIG. 2 is a schematic diagram of an electrical tap in accordance with the invention.

A modified tap 30 is shown in FIG. 2 which enables optical node 12 to be powered from an individual's home that has a backup power supply. Tap 30 incorporates a power return path 32 to allow AC electrical power to be passed from a user home to supply power to node 12. It is desirable to use AC power from the individual home rather than DC power from a battery as using direct current will cause electrical corrosion. It is also important to ensure that the home with the backup power supply is not inadvertently feeding power to other homes via the cables. Power return path 32 incorporates a switch 34 operable in response to establishment of power at a user home, the switch operating to connect to the upstream path and so supply AC power to reach node 12. This ensures that when an individual user has power reinstated, node 12 activates and the user is able to receive and transmit broadband signals, rather than having to wait until reinstatement of the main electricity grid supplying power to supply unit 14.

Tap 30 comprises input 36 and output 38 connected within signal path 16, and directional coupler 40 made from a ferrite core and which is disposed between capacitors 44, 46 in the line 48 from input 36 to output 38 and bypassed by a power choke 42. Power choke 48 is a large inductor and bridges the ferrite directional coupler 40 as the coupler is not capable of carrying any significant AC or DC current.

The coupled port 50, also known as tap port, of ferrite core directional coupler 40 is connected to an input port 52 of a splitter 54 with the output ports of splitter 54 connected to output ports or connectors 60, 62, 64, 66. Between each output port and splitter 54 is disposed a capacitor 68, of which only one is shown for simplicity, so as to prevent AC power travelling from user homes through ports 60, 62, 64, 66 to reach splitter 54. Splitter 54 can be of different architecture, for example two way, three way, four way, six way or eight way depending on the needed number of user output ports on the outdoor tap.

Power return path 32 comprises coil 70, switch 34 with associated relay 72, diode 74 and capacitor 76 associated with the diode. Each output port 60, 62, 64, 66 is connected to the power return path, with this connection occurring between the port and capacitor 72 as is shown for port 66. For simplicity, only one such connection is shown. Power return path consists of a main line 80 along which AC power travels and a subsidiary line 82, main line 80 connectable to the electrical path in which power choke 48 is located. The subsidiary line 82 consists of elements configured to operate switch 34, with diode 74 rectifying the AC power into a DC signal to operate relays 72.

When the main power supply is operational, switch 34 is inactive and tap 30 operates in the usual manner with power choke 48 allowing AC power to pass from input 30 to output 38, with RF signal passing through diplexer 40 and splitter 52 to supply the plurality of output ports 60, 62, 64, 66 connected to individual users.

When mains power is interrupted, all homes 22, 22', 22''' and optical node 12 lose power. When one home regains power due to a backup power supply, such as a generator, power from the home passes via coil 70 to switch 34 and diode 74. Diode 74 rectifies the AC power and via capacitor 76 supplies power to relays 72. Relays 72 activate switch 34 to move from position 80 to position 82, so completing power return path 32 and allowing AC power to pass from the user, along power return path 32, and along coaxial cable path 18 to reach upstream node 12 which will then become operational in response to this power.

When power is restored, the AC current passing through power choke 48 is such as to reset switch 34 and restore the normal mode of operation of tap 30.

Figure 3:
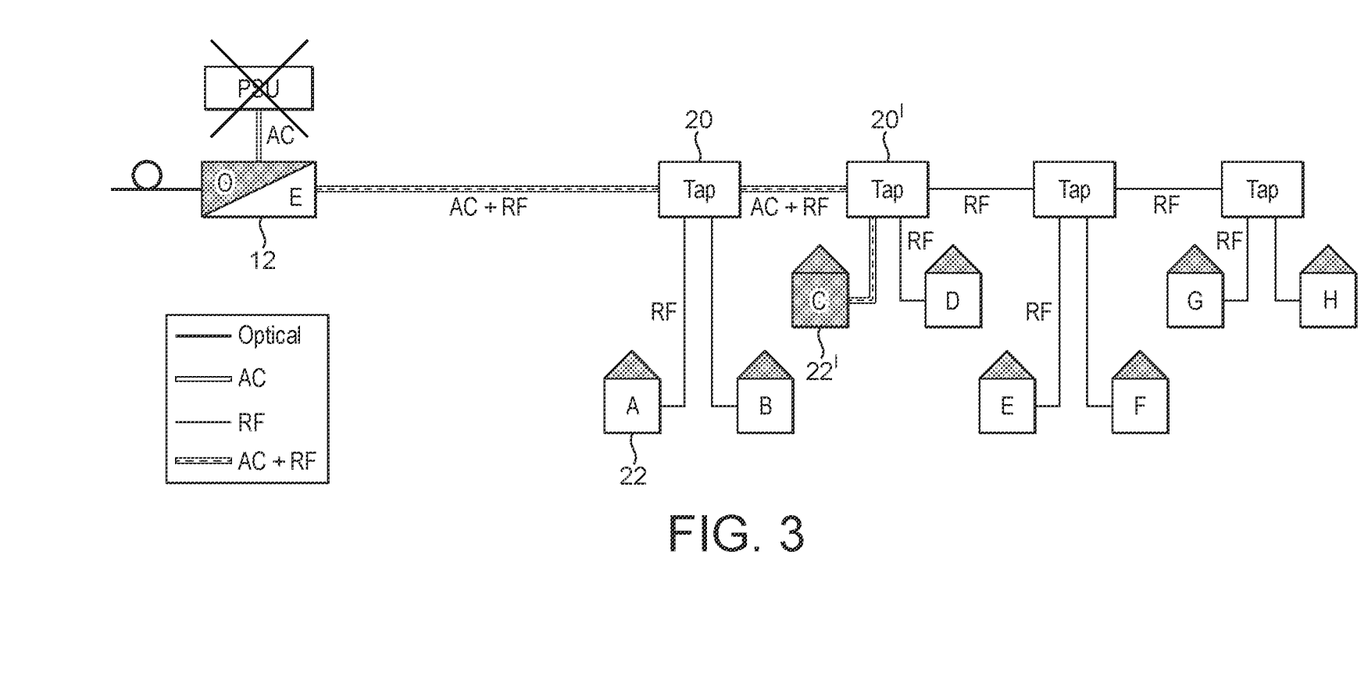
FIG. 3 is a schematic diagram of a broadband network incorporating a plurality of electrical taps as shown in FIG. 2.
Figure 4:
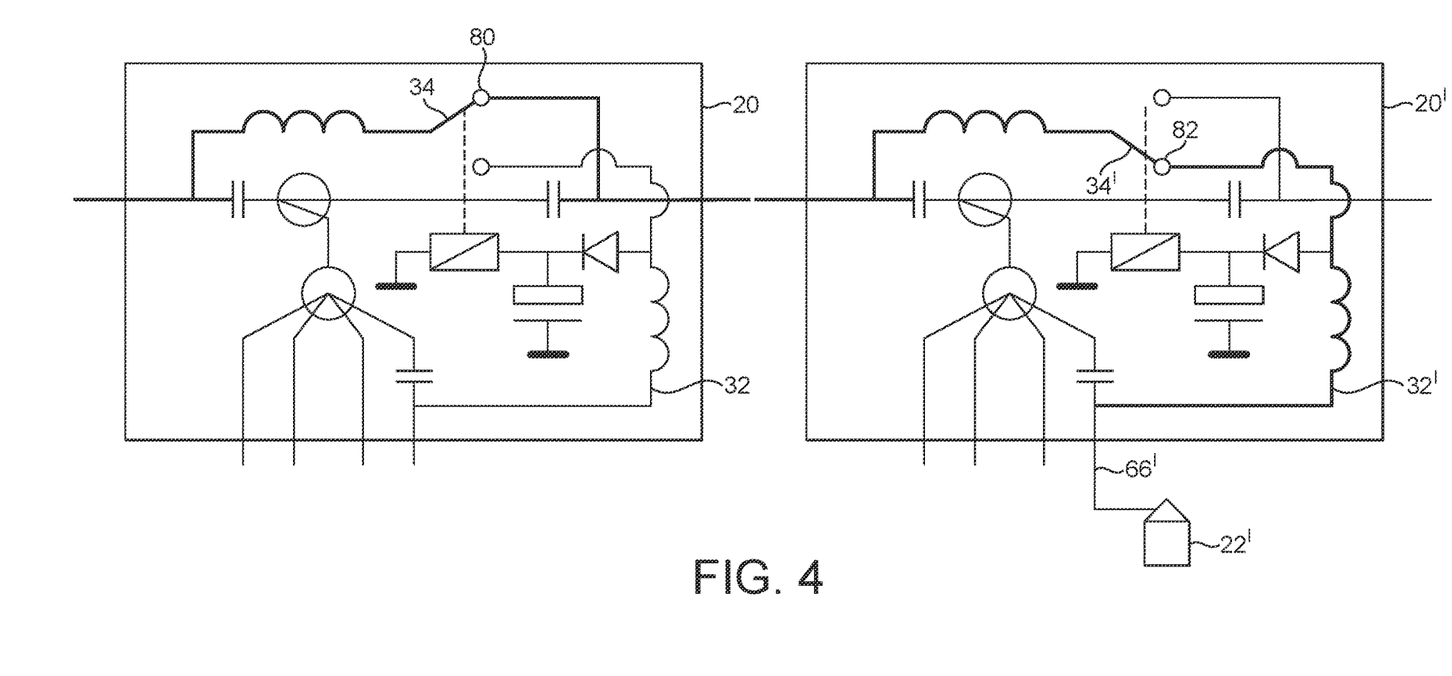
FIG. 4 illustrates a power return path within the electrical tap.

FIG. 3 shows a schematic arrangement of network 10 when power is interrupted to power supply unit 14 and home 22' connected to second tap 20' has a backup power supply operational. In this arrangement, the paths through the first and second taps 20, 20' are shown as in FIG. 4, with tap 20' receiving AC power from home 22' through port 66' which operates switch 34' to complete power return path 32' so supplying AC power to node 12. The first tap 20 at which no houses have any backup power supply remains configured as usual with the power return path 32 not operational.

Figure 5:
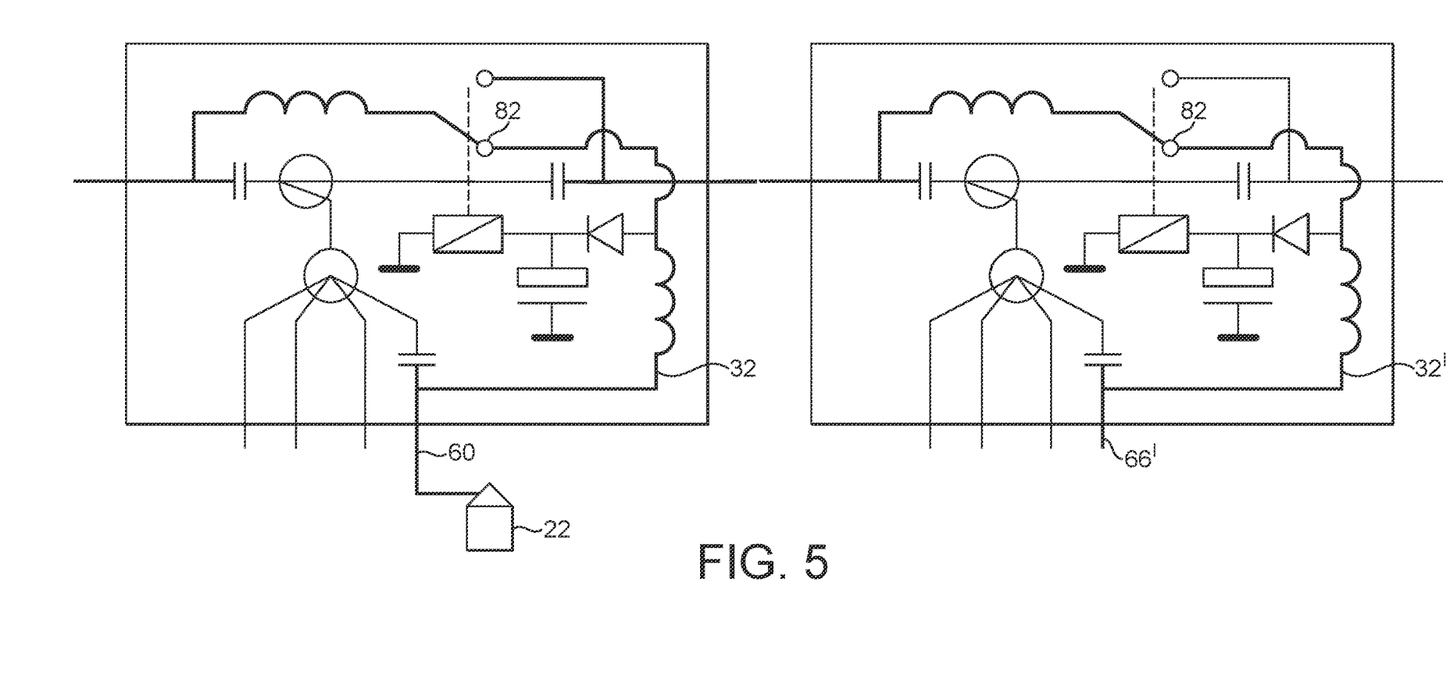
FIG. 5 illustrates power return paths when users connected to different taps obtain backup power.

Should home 22 then have a backup power supply become operational, power return path 32 in tap 20 is also activated, see FIG. 5. In this situation, home 20 provides the AC power reaching node and ensures a broadband connection to tap 20' is achieved, both homes 20, 20' having broadband communication restored to them.

By configuring power return path 32 in this way, no electrical power passes from home 22' to other homes in the network.

Figure 6:
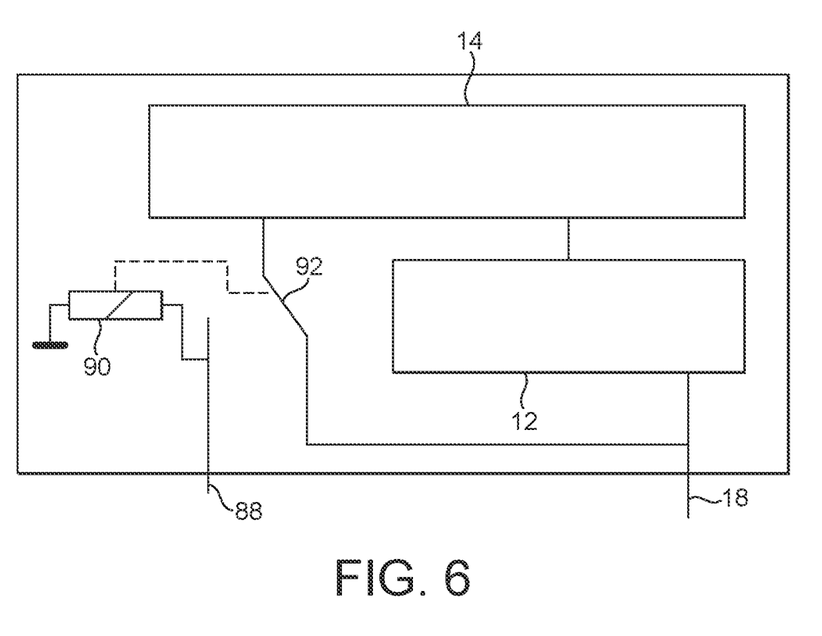
FIG. 6 is a schematic diagram to illustrate powering of an active component.

The active device, such as node 12, requiring power from the user home can be configured to selectively take power from power supply unit 14 when the mains supply is active and to take power from a user house with a backup power supply when the mains power supply is not active, typically using switches or relays. One way of achieving this is shown in relation to FIG. 6. If power comes into the device via a normal power input 88, such as a mains electricity supply, relays 90 are powered and switch 92 will connect to power input 88 to provide mains power to power supply unit 14. In the event of loss of power from the mains supply, relays 90 switch back to the default position shown in FIG. 6. When at least one house has an operational backup power system, power is fed back from the house to output 18 to power the power supply unit 14. When the mains power supply is restored, relays 90 switch back to power the unit 14 from mains power input 88.

To modify a standard tap with the components of diode, capacitor, relays, and power coil as in this design, a backplate compatible faceplate can be used to implement the reconfigured circuitry, so just swapping an existing faceplate with a faceplate configured in accordance with the circuitry shown in FIG. 2 allows ready updating to implement the power return path.

The invention claimed is:

1. An electrical tap unit comprising an input and an output connectable to a signal path carrying electrical power and an RF signal, and a plurality of output ports connectable to users of a broadband network, wherein a power return path is provided between each output port and the input, the power return path selectively actuable during an interruption to a mains electricity supply to transmit electrical power from a user with a back-up power supply so as to power a node disposed in a signal path connectable to the input and enable the user with a back-up power supply to receive and transmit broadband signals.

2. An electrical tap according to claim 1, wherein a switch means is disposed in the power return path, the switch means selectively operable to activate the power return path.

3. An electrical tap according to claim 2, wherein the power return path comprises a first section connectable to the input and a second section to activate the switch means.

4. An electrical tap according claim 3, wherein the second section comprises a rectifier to convert AC power to DC power and switch operating means.

5. An electrical tap according to claim 2, wherein the power return path conveys at least AC power.

6. An electrical tap according to claim 1, wherein the switch means is operable between a first position in which the power return path is not active and a second position in which the power return path is active.

7. An electrical tap according to claim 1, wherein the switch means is responsive to AC power from a user when a main electrical grid supply is interrupted.

8. An electrical tap according to claim 1 being an outdoor tap.

\* \* \* \* \*